(12) United States Patent
Huber

(10) Patent No.: US 9,096,317 B2
(45) Date of Patent: Aug. 4, 2015

(54) CARGO COMPARTMENT WITH ROBOT, AIRCRAFT, FREIGHT STORAGE DEVICE

(75) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 63 days.

(21) Appl. No.: 13/556,356

(22) Filed: Jul. 24, 2012

(65) Prior Publication Data

US 2013/0186999 A1  Jul. 25, 2013

(30) Foreign Application Priority Data

Jul. 29, 2011 (DE) .......................... 10 2011 052 277
Jul. 29, 2011 (DE) .......................... 10 2011 052 299

(51) Int. Cl.
*B64D 9/00* (2006.01)
*B64C 1/22* (2006.01)
*B64D 11/00* (2006.01)

(52) U.S. Cl.
CPC ... *B64D 9/00* (2013.01); *B64C 1/22* (2013.01); *B64D 11/003* (2013.01); *Y10S 901/07* (2013.01); *Y10S 901/31* (2013.01)

(58) Field of Classification Search
CPC ............ B64C 1/22; B64C 1/20; B64D 9/003; B64D 9/00; B64D 11/003
USPC ....................... 244/118.1, 118.2, 137.1, 118.5
See application file for complete search history.

(56) References Cited

U.S. PATENT DOCUMENTS

| 2,404,195 | A | * | 7/1946 | Schlieben ................... 244/137.1 |
|---|---|---|---|---|
| 3,552,587 | A | * | 1/1971 | Warren ....................... 244/137.1 |
| 5,031,861 | A | * | 7/1991 | Wojdylo ..................... 244/118.5 |
| 5,074,496 | A | * | 12/1991 | Rezag et al. ............... 244/118.1 |
| 5,159,994 | A | | 11/1992 | Luria |
| 5,322,244 | A | * | 6/1994 | Dallmann et al. ......... 244/118.1 |
| 5,496,000 | A | * | 3/1996 | Mueller ...................... 244/118.1 |
| 5,727,654 | A | * | 3/1998 | Roessner et al. ........... 244/118.1 |
| 5,967,739 | A | * | 10/1999 | Bennison ................... 414/744.3 |
| 6,340,136 | B1 | | 1/2002 | Luria |
| 6,454,208 | B1 | | 9/2002 | Nervig et al. |
| 6,580,046 | B1 | | 6/2003 | Koini et al. |
| 6,588,574 | B2 | * | 7/2003 | Koini et al. ....................... 901/7 |
| 6,874,735 | B1 | | 4/2005 | Audyli |
| 7,021,449 | B2 | * | 4/2006 | Koini et al. .................... 198/358 |

(Continued)

FOREIGN PATENT DOCUMENTS

| DE | 8813477 | U1 | 2/1989 |
|---|---|---|---|
| DE | 4208478 | A1 | 9/1993 |

(Continued)

OTHER PUBLICATIONS

Search Report in EPO patent application EP12177756, dated Oct. 16, 2012.

(Continued)

*Primary Examiner* — Tien Dinh
*Assistant Examiner* — Richard R Green
(74) *Attorney, Agent, or Firm* — Barnes & Thornburg LLP

(57) ABSTRACT

Conventional aircraft offer an inadequate solution for handling freight items. The present invention significantly improves the handling of freight items. Inter alia, for this the cargo compartment of an aircraft is equipped with a robot with at least one robot arm, wherein the robot arm comprises a receiver tool to receive freight items and is arranged displaceably on a ceiling construction of the cargo compartment.

12 Claims, 5 Drawing Sheets

(56) References Cited

U.S. PATENT DOCUMENTS

Figure 1:
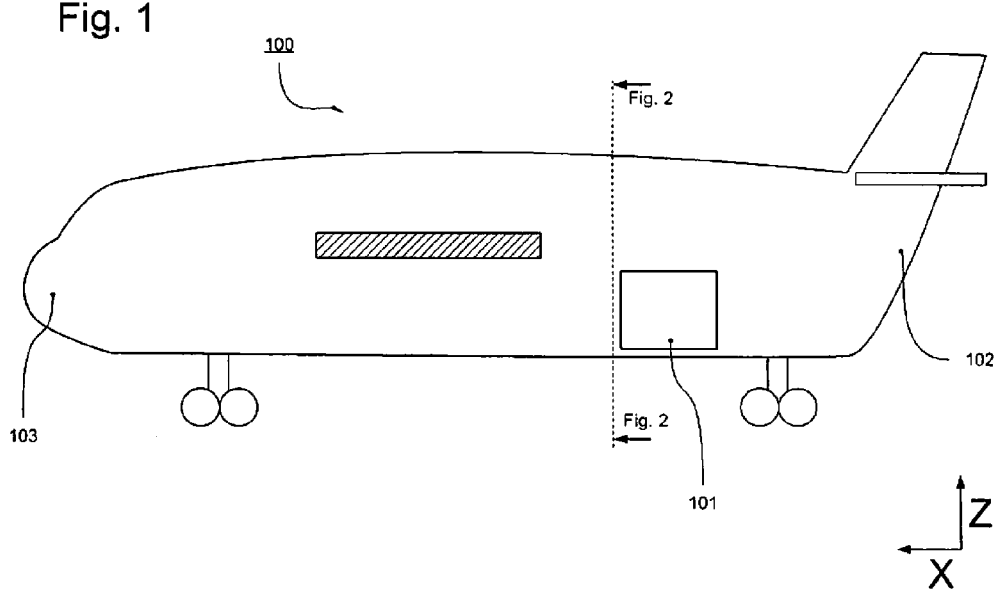

| | | |
|---|---|---|
| 8,509,945 B1* | 8/2013 | Snaith et al. ........... 700/218 |
| 2006/0133913 A1 | 6/2006 | Helmner |
| 2007/0284481 A1 | 12/2007 | Linero |
| 2008/0035792 A1 | 2/2008 | Harrington et al. |
| 2008/0128248 A1 | 6/2008 | Hoffjann et al. |
| 2008/0281717 A1* | 11/2008 | Kortelainen ........... 700/215 |
| 2010/0145502 A1 | 6/2010 | Kratzmaier |
| 2012/0325969 A1 | 12/2012 | Helmner |

FOREIGN PATENT DOCUMENTS

| | | |
|---|---|---|
| DE | 4302706 A1 | 8/1994 |
| DE | 102010013219 A1 | 9/2001 |
| DE | 10 2006 022144 A1 | 11/2007 |
| DE | 102006022144 A1 | 11/2007 |
| DE | 102007023658 A1 | 11/2008 |
| EP | 1070664 A2 | 1/2001 |
| EP | 1764304 A2 | 3/2007 |
| EP | 10 2009 052547 A1 | 5/2011 |
| FR | 2669873 A1 | 5/1992 |
| WO | 9854073 A1 | 12/1998 |
| WO | 03076267 A1 | 9/2003 |
| WO | 2007051593 A2 | 5/2007 |
| WO | 2007051593 A3 | 5/2007 |
| WO | 2008118076 A1 | 10/2008 |
| WO | 2009007549 A2 | 1/2009 |
| WO | 2011080414 A1 | 7/2011 |
| WO | 2011132202 A1 | 10/2011 |

OTHER PUBLICATIONS

Search Report in EPO Application 12177756, dated Feb. 15, 2013.

* cited by examiner

CARGO COMPARTMENT WITH ROBOT, AIRCRAFT, FREIGHT STORAGE DEVICE

BACKGROUND

The invention concerns a cargo compartment of an aircraft comprising a robot with at least one robot arm, an aircraft and a freight storage device.

In commercial aviation, a distinction is made between wide-bodied aircraft, narrow-bodied aircraft and regional jets. In wide-bodied aircraft, usually standardized freight units, in particular freight containers and/or freight pallets, are loaded in the lower deck cargo compartment. In the rear of wide-bodied aircraft there is usually a smaller bulk cargo compartment for loading bulky luggage and/or late-delivered luggage which must be available again quickly after landing (e.g. wheelchairs). Normally the cargo compartments of such wide-bodied aircraft are around 1.6 meters high and can be loaded with containers type LD-3.

In contrast the lower deck cargo compartment of a narrow-bodied aircraft is substantially smaller in dimensions. When loading these cargo compartments, corresponding freight units (e.g. freight containers) are not usually used. Instead bulk loading is used. The individual freight items are placed on a conveyor belt outside the aircraft which delivers them to the inlet area or loading hatch of the cargo compartment. A person sits there, who throws or pushes the luggage further to the back inside the cargo compartment. Inside the cargo compartment is a further person who successively stacks the luggage. These cargo compartments are usually around 1 meter high so the loading personnel have difficulty moving therein. There are narrow-bodied aircraft (e.g. the A320 series) which allow loading of special freight containers. The loading of these containers is problematical.

In regional jets there is a special, also small cargo compartment behind the cabin e.g. at the same level as the cabin. Furthermore there are corresponding aircraft which have very small cargo compartments below the cabin, corresponding substantially to the lower deck cargo compartments of narrow-bodied aircraft. These however are very small, usually only have the cross section of a single suitcase and a height of less than half a meter. Such cargo compartments are usually loaded totally manually.

In the past attempts have been made to simplify loading for narrow-bodied aircraft as the conventional, mainly manual loading process is time-intensive and hence costly, and unhealthy for the ground crew. The ground crew is obliged to lift and stow heavy freight items, e.g. weighing 35 kilos, in very constricted spaces.

It has been considered for example to install freight conveyor belts within the cargo compartments to stow the freight items in an unordered manner within the cargo compartment (WO 2008/118076 A1).

A common solution at present is the "sliding carpet". Here the floor area and parts of the side area of the cargo compartment are lined with a conveyor belt. A person sitting in the inlet region of the aircraft stacks the cases arriving into a row or a type of wall of freight items. The conveyor belts are then moved such that there is space for stacking a further row. This process is repeated until the entire cargo compartment is fully loaded. On unloading, the individual rows are discharged successively and the conveyor belts moved accordingly.

One disadvantage of this loading process is that the installation of the conveyor belts takes up loading space and the weight of the device contributes significantly to the total weight of the aircraft. This means that less freight can be transported and the fuel consumption rises. This leads to higher transport costs. Furthermore certain gaps must be maintained from the side walls (lining) and ceiling else the freight items can lie against these on movement of the conveyor belts. This can lead to damage of the aircraft, the falling of previously stacked freight item rows or the seizing of freight items. Furthermore securing the loaded freight items suitably has proved extremely problematical. No intermediate nets can be used which absorb the loads occurring during flight along the longitudinal direction or X direction of the aircraft and dissipate these to the fuselage of the aircraft. If no such nets are used, the individual freight items can move around the entire cargo compartment as one unit.

WO 98/54073 discloses a loading system in which the ground crew is supported by means of an extendable conveyor belt and a loading table arranged on the end of this conveyor belt. This system is used merely as a loading and unloading aid and then remains on the ground. Finally, within the aircraft several small conveyor belts are arranged in succession such that a narrow continuous conveyor belt results along the longitudinal direction which extends from the loading hatch to the rear area of the cargo compartment. Incoming freight items are loaded on this conveyor belt and transported to the end of the cargo compartment. There the freight items are stacked as already described. As soon as a row is full, the conveyor belt is retracted successively with the associated loading table. This solution has several disadvantages. Firstly the loading system is expensive and requires a lot of maintenance. Furthermore freight items frequently fall off the narrow conveyor belt so that ground crew must again assist manually. Finally there is a substantial risk that the aircraft will be damaged on temporary installation of the freight loading system. The ground crew must be trained accordingly in order to perform the installation safely.

Further solutions are known (e.g. from WO 2009/007549 A2) but all entail substantial disadvantages.

In general therefore the aim is to make increasing use of freight units, in particular freight containers, for rapid loading and unloading of aircraft. However the use of freight containers has numerous disadvantages. Different containers are required for different aircraft types (e.g. wide-bodied aircraft, narrow-bodied aircraft). If individual freight containers are not used, they must be stored. Many airports do not at present have sufficient capacity to store these freight containers suitably. Freight containers have a relatively high own weight so that transport in the aircraft is costly. Furthermore freight containers must be constructed relatively simply so it is not possible to adapt these optimally to the structure of the aircraft. To this extent the use of freight containers leads to a loss of useful cargo space. Furthermore it must be noted that both maintenance and purchase of freight containers entail no insignificant cost.

Many airports also do not have the necessary equipment for loading freight containers quickly and efficiently. Finally, loading and unloading the freight containers takes time, so that the benefits and disadvantages of the use of containers must be evaluated carefully in order to achieve an optimum result. Therefore aircraft are still fitted with bulk loading compartments.

A further problem which occurs on air transport of freight items for passengers is that many passengers do not wish to hand over freight items. The passengers would prefer to take all luggage items with them into the passenger compartment in order to have access to this luggage at any time. There would then be no lengthy hand-over of freight items at check-in. Also for passengers the benefit would arise that on leaving the aircraft, they need not wait for the luggage to be unloaded and finally handed back. A trend is appearing in which more and more freight items are carried in the passenger compartment. Existing passenger compartments however often do not have sufficient capacity to receive all these freight items. Even if the freight items can be received in the passenger compartment by the provision of adequate storage space, not least significant problems arise for the aircraft operator. Firstly the luggage must be examined very carefully to prevent terrorist attacks. Furthermore incorrectly stowed luggage can lead to injury to passengers. Finally the provision of corresponding storage space would mean that only little space would be left in the passenger compartment for the passengers. This has an effect on the wellbeing of the passengers.

To take at least partial account of this problem, WO 2007/051593 proposes providing suitable freight containers directly at the entrance to the aircraft which can be loaded by the passengers. These freight containers are then brought into the cargo compartment of the aircraft, transported and after landing erected again so that passengers can extract their own freight items. However there is no access to the freight items during the flight.

Starting from this prior art, the object of the present invention is to provide a better equipped aircraft so that freight items can be transported comfortably and efficiently. Furthermore the process of loading and unloading the cargo compartment is simplified. In total the passengers are able to hand over their freight items as quickly and as easily as possible and have access to these at any time.

This object is achieved amongst others by a cargo compartment according to claim 1.

In particular the object is achieved by a cargo compartment of an aircraft which comprises a robot with at least one robot arm with at least one receiver tool to receive freight items, wherein the robot is arranged displaceably on a ceiling construction of the cargo compartment.

This ceiling construction can for example be the centre deck of the aircraft or an arbitrary construction above the freight deck. If a correspondingly suspended robot system is used, optimum use of the cargo compartment can be achieved. The loading process itself can be performed fully automatically in constricted cargo compartments, wherein the robot performs the loading and unloading process. The cargo compartment can then be utilized to the optimum since, inter alia, no walkable surfaces are required. Furthermore it is not necessary to provide standardized tracks on which freight containers or freight pallets can be transported. Also regions located for example between the frames of the aircraft construction can be fully utilized. The system is particularly suitable for use in small cargo compartments (e.g. with low height).

The cargo compartment can comprise a holding device attached to the ceiling construction, in particular with at least one linear guide and a drive unit to move the robot attached to the holding device, preferably along at least one longitudinal axis of the aircraft.

It is conceivable that the robot arm is designed such that a statically attached robot has access to all necessary regions of the cargo compartment. Alternatively it would also be possible to arrange several robots such that they perform loading and unloading in cooperation. For example a first robot can transfer a freight item to a second robot. Preferably the robot can however travel within the cargo compartment so that greater distances can be covered. In one embodiment example, for this linear guides are provided on the ceiling construction on which the robot is suspended, wherein the drive unit ensures that the robot can be moved along these linear guides. This holding device is preferably designed at least such that the robot can travel along the longitudinal axis of the aircraft.

Moving the robot along the retaining device leads to a more efficient use and allows the transport of freight items with high weight as the robot arm can be designed substantially shorter (smaller lever).

In one embodiment the holding device can comprise a peripheral linear guide on which at least two robots are attached. The efficiency of the loading system can thus be increased further in that several robots are provided which can each be moved along a proposed holding device. If the holding device is a peripheral linear guide, the robots can act parallel to each other without conflict situations. For example a first robot can pick up a first freight item at the loading hatch of the aircraft and transport this into the interior of the cargo compartment. Then a second robot can pick up a second freight item from the loading hatch and follow the first robot. While the second robot is still busy stowing the freight item, the first robot can move back to the loading hatch on a parallel linear guide to pick up further freight items. A type of circular operation occurs which leads to very rapid loading and unloading.

The cargo compartment can comprise a freight deck with preferably passive freight conveyor devices, in particular ball mats and/or rollers and/or roller tracks, wherein the robot is formed and/or arranged to move freight units stored on the freight conveyor devices, in particular freight containers and/or freight pallets. The robots can therefore be used not only to pick up and load individual freight items virtually manually. Rather the robots can also be used to bring freight containers to a predefined position. Theoretically it is conceivable that the robot is dimensioned such that it lifts corresponding freight units and lowers these at a predefined position in the manner of a loading crane. Preferably however passive freight conveyor devices are provided, for example freight conveyor devices without their own in particular electric drive, on which the freight units can be moved with low force. Finally the freight delivery units receive the main load of the freight container. The robot is used merely to move, in particular push, the freight units on the freight conveyor devices in a predefined direction. To this extent it is possible to omit active freight conveyor devices, for example roller drive units (PDU power drive units). The robot need not be equipped to carry the entire load independently.

In total the robot can thus be used for different loading systems, wherein individual freight items in the manner of bulk loading, and freight units with a multiplicity of freight items, can be loaded.

The object cited above is furthermore achieved by a freight storage device for a cargo compartment of an aircraft with a multiplicity of freight compartments which are each formed by a multiplicity of side walls and comprise at least one freight opening for insertion and removal of freight items, wherein at least some of the side walls are connected together flexibly and/or rotationally mobile and/or translationally mobile such that the dimensions of at least one freight compartment can be changed by moving at least one side wall.

Such a freight storage device can be a type of shelf unit which is arranged or integrated on the side walls of the cargo compartment. Alternatively this freight storage device can be arranged on the floor of the cargo compartment so that the freight compartments extend substantially perpendicular to the floor surface, the openings facing upwards.

The freight storage device according to the invention allows efficient loading in particular of individual freight items for example suitcases, rucksacks, bags etc. The freight items are suitably placed in the freight compartments which are afterwards or previously adapted to the size of the freight items. To this extent the existing space can be utilized optimally, wherein a separate freight compartment is provided for each freight item. Later retrieval of the freight item is substantially facilitated. To this extent individual freight items can be unloaded in a targeted manner or provisionally made available to the passenger. The freight storage device according to the invention furthermore allows the compression of soft freight items for better utilization of the existing space.

In theory it is possible to use any arbitrary materials for the side walls of the freight compartments. For example a hanging shelf of fabric can be used according to the invention. In one embodiment example however rigid materials, in particular plastics and/or metal alloys, are used.

The freight storage device can comprise longitudinal partitions and transverse partitions to form the side walls. Preferably the longitudinal partitions can be displaced in relation to the transverse partitions and/or the transverse partitions can be displaced in relation to the longitudinal partitions. Such a displacement can be a parallel displacement. It is conceivable to arrange several partitions in the manner of a grid to form the individual freight compartments. Preferably at least one longitudinal partition or at least one transverse partition can be displaced such that the dimensions of the associated freight compartments are adapted to the corresponding freight items.

At least one freight compartment can comprise a closing device, in particular a roller shutter and/or net to at least partly close the freight opening. It is advantageous if the freight openings are closed during flight so that the freight items stored cannot fall out.

The freight storage device described can advantageously be used in any cargo compartment, in particular in a cargo compartment as already described. Also numerous positive synergy effects are achieved in conjunction with the robot described.

The object cited initially is furthermore achieved by a cargo compartment of an aircraft which comprises at least one freight storage device with a multiplicity of freight compartments, wherein at least one of the freight compartments is formed such that it can be loaded from above, in particular in a direction perpendicular to a freight deck of the cargo compartment. Said freight storage device can be a freight storage device as already described. It is possible to equip any arbitrary cargo compartment, including that already described, with a corresponding horizontal freight storage device.

Said freight storage device can better utilize the existing areas in the cargo compartment of the aircraft. For example the concave regions in the floor area resulting from the aircraft design can be fully utilized. The freight storage device described is particularly suitable for loading by a robot arranged for example on a ceiling construction. For loading by robot, no walkable floor for the personnel is required so the cargo compartment can be utilized very efficiently.

The object cited above is furthermore achieved by an aircraft with at least one passenger compartment and at least one cargo compartment, wherein the cargo compartment is preferably designed as already described. A robot can be provided for stowing freight items from the passenger compartment in the cargo compartment.

This robot can be formed as already described above. It is however also conceivable to use a different robot. A correspondingly equipped aircraft allows the passengers to take individual freight items, preferably hand luggage, with them into the passenger compartment. There the freight item is handed over and stowed not in the passenger compartment but in the cargo compartment. Preferably the aircraft is equipped such that the passenger can access the freight item again during the flight. For example after stowing a freight item, the robot can retrieve this again on request and deliver it directly or indirectly to the passenger.

The robot can comprise at least one, preferably at least two receiver tools for receiving freight items. A corresponding multiplicity of receiver tools allows different freight items to be picked up and transported suitably.

The aircraft, in particular the robot, can comprise at least one image capture device to provide at least one image of a freight item to be transported, wherein the robot is formed to select the receiver tool to receive the freight item to be transported on the basis of the image. It is conceivable to control the selection of a suitable receiver tool by an arbitrary mechanism. For example freight items for a first receiver tool can be provided in a first region and freight items for the second receiver tool in a second region. Furthermore the freight items can be fitted with a corresponding digital code (e.g. RFID, Bluetooth, 2D codes, 3D codes) so that from this information the robot knows which receiver tool should be used. Furthermore on hand over of the freight item, an input can be made which allows a suitable receiver tool to be selected. Preferably a selection is made however on the basis of a digital image capture system in which different freight items (e.g. rucksack, hard case) are recognized automatically. Alternatively or additionally recognition can be based on mechanical test results. For example the robot can have a gripper tool which (slightly) compresses the freight item to be transported and determines the hardness of the freight item by means of one or more force sensors.

After image recognition of the freight item, which preferably also detects its rough dimensions, an "odor identification" can take place. For example corresponding sensors can be provided to identify suspect chemicals (e.g. for bombs). This test can advantageously take place with the compression of the freight item described above. After or during the odor identification, an additional density test can take place as described above. This density test can also be used to determine the maximum compression force required for lifting a particular freight item.

A weight determination can take place with suitable sensors. The weight determination can be used for example to move heavy objects more slowly and/or carefully. Furthermore the particular weight can be decisive for where the corresponding freight item is stored. If a shelf unit is used for example for loading the freight item, heavy freight items are stored substantially further down than light freight items.

The receiver tool can comprise at least one vacuum head to hold freight items with an at least partly air-impermeable outer skin. With a corresponding tool head, corresponding freight items can be picked up and transported very easily and efficiently.

As already explained, at least one of the receiver tools can comprise at least one gripper tool for gripping freight items and/or at least one conveyor belt for receiving and depositing freight items. Such receiver tools are particularly suitable for picking up and transporting air-permeable freight items and/or freight items of soft material.

In these cases the receiver tool can be a type of mini-conveyor belt which loads or unloads the luggage item by driving the conveyor belt.

A receiver tool equipped with the corresponding conveyor belt can furthermore have side limiters which where applicable can compress and grip the freight item after it has been picked up. Furthermore this mechanism can be used to determine the density of the freight item or take other measurements.

Alternatively a type of "gripper fork" can be used, as fitted for example on overhead traveling cranes. It would also theoretically be conceivable to provide gripper tools which substantially emulate human hands, wherein for example flexible segments are provided in the fork contour.

It is conceivable to optimize said gripper tools such that these are ideal for gripping freight items with a maximum dimension of approximately 55×40×20 cm.

The object cited initially is furthermore achieved by an aircraft with at least one passenger compartment, at least one cargo compartment and at least one freight administration device, wherein the freight administration device comprises at least one freight item receiver device to receive a freight item, at least one input device to detect preferably the code allocated to the freight item, and at least one freight item loading device, in particular a robot. The freight administration device is preferably formed such that after input of a code, at least the freight item loading device is controlled such that the associated freight item is taken from the cargo compartment to the passenger compartment in the freight receiver device. The aircraft can be designed as described above. Furthermore the above-mentioned cargo compartment can be designed as described above. In particular the freight item loading device can comprise a robot with the features already explained.

By means of said freight administration device it is possible that a freight item not in the passenger compartment is issued to a passenger on the basis of a code. This process can be performed automatically. To this extent the passenger compartment can be substantially free from freight items not required. The freight administration device allows optimization of the entry and/or exit process as the passengers can enter and leave the aircraft with their luggage. Additional luggage delivery and collection processes can be at least partly omitted.

The freight item receiver device can comprise a lift and/or a connecting opening and/or a chute for transport of freight items from the passenger compartment to the cargo compartment. The freight item receiver device can thus be the connecting element between the passenger compartment and the cargo compartment so that delivery and collection of the freight items is optimized.

The input device can be a read device for an identification device preferably arranged in or on the freight item, in particular a passive transponder and/or a 2D and/or 3D code. To this extent it is possible to allocate an identification number or corresponding code automatically to a particular freight item so that this can always be clearly identified. This code can be used, inter alia, for later collection of the freight item. For example a passenger in the passenger compartment can enter a corresponding code on the freight item receiver device so that the freight administration device knows which freight item is required. Alternatively it is conceivable to associate the passenger with an identification number or identification code wherein the freight administration device knows which freight items should be allocated to which passenger. Corresponding data can be stored in a memory device provided to this end. For example a table can be provided with allocation of personal codes to freight item codes.

The freight administration device can be adapted to determine a storage position for a freight item entered in the freight item receiver device, control the freight item loading device such that the freight item is stowed in the storage position, preferably in the cargo compartment, and memorize the storage position preferably in conjunction with a code allocated in particular to the freight item and/or person. To this extent the freight administration device need not search for a particular freight item but knows precisely where this is stored. Consequently the collection process for freight items it optimized.

In one embodiment example the freight administration device can comprise a passenger detection device for detecting the position of at least one passenger and providing corresponding position data, wherein the freight administration device is formed to take the position data into account on an unloading process. An unloading process can thus be optimized. For example it is conceivable that after landing, all passengers want access to the freight items they have handed over. The freight administration device according to the invention is designed such that freight items are delivered only at predefined positions within the passenger compartment. For example the freight items can be provided by one or more freight item receiver devices. After the aircraft has landed, there may be a random order in which the passengers can seek a corresponding freight item receiver device. The data from the passenger detection device can advantageously be used to determine in what order certain freight items are collected. To this extent the freight administration device can take this order into account. For example pauses occurring can be used by the freight item loading device to store freight items at a suitable position so that these can be made available to a particular passenger at the correct time.

Preferably the passenger detection device comprises a device for detecting preferably passive transponders. The individual passengers can advantageously be equipped with corresponding transponders so that they can be easily identified.

BRIEF DESCRIPTION OF THE DRAWING FIGURES

The invention is described below by means of several embodiment examples which are explained in more detail with reference to the drawings.

Figure 2:
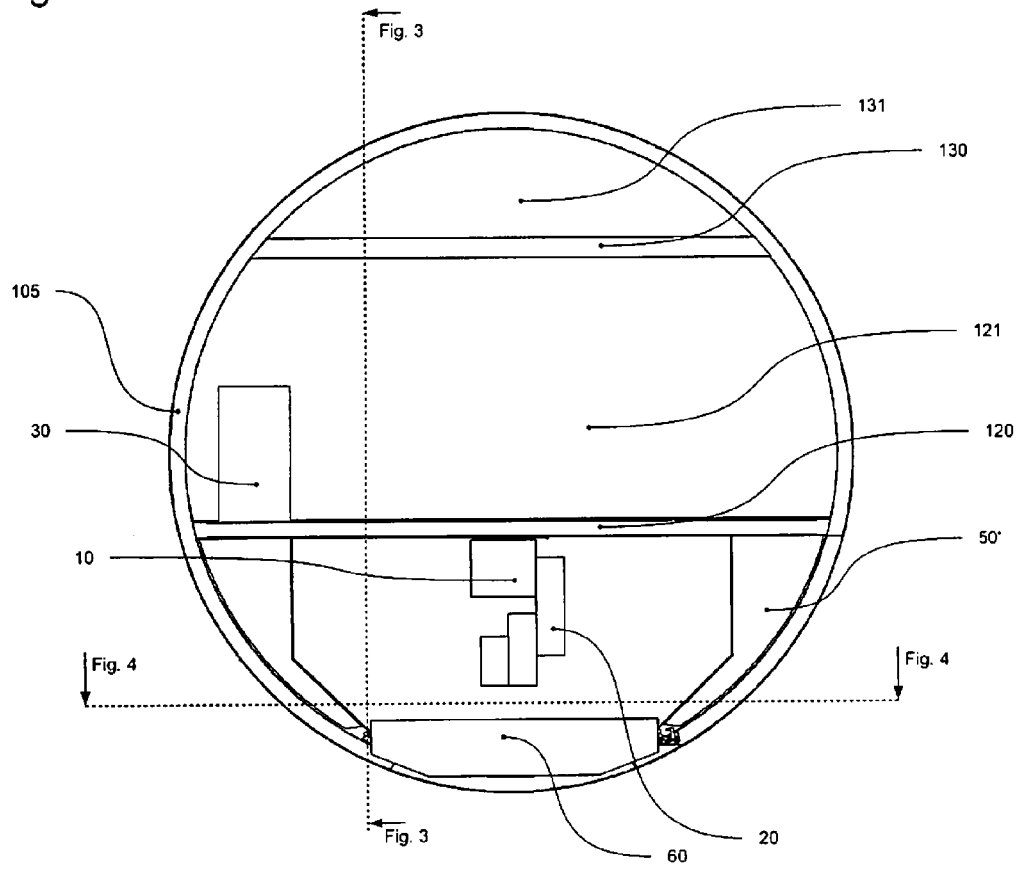
Figure 3:
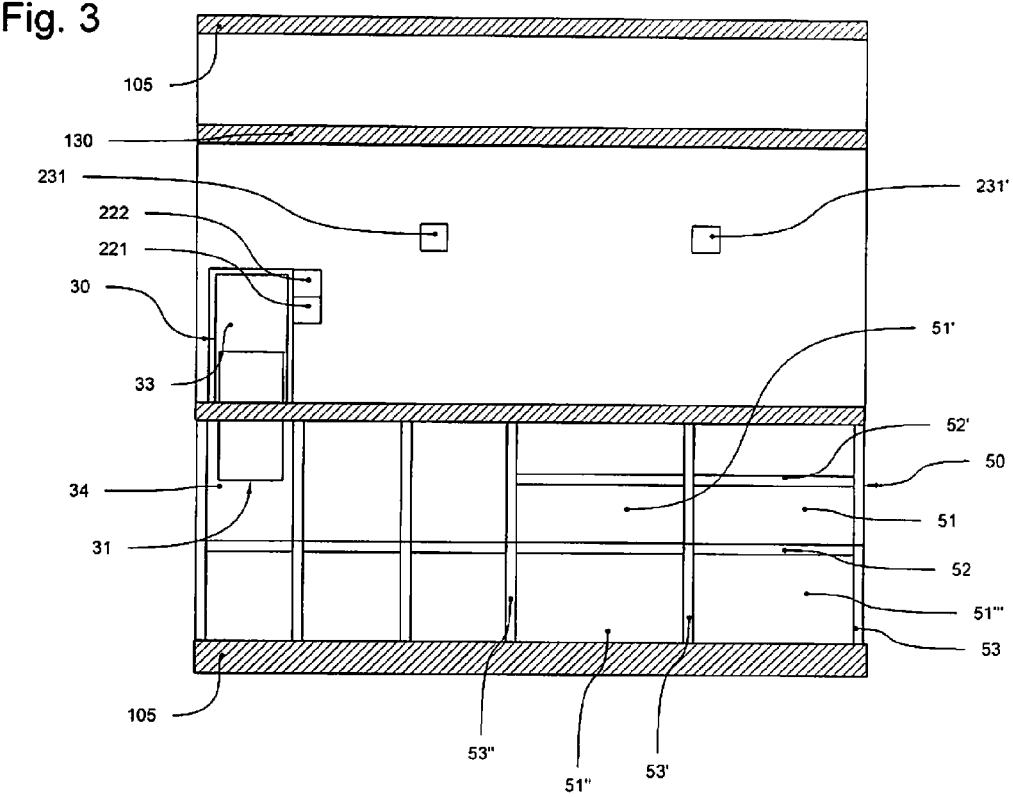
Figure 4:
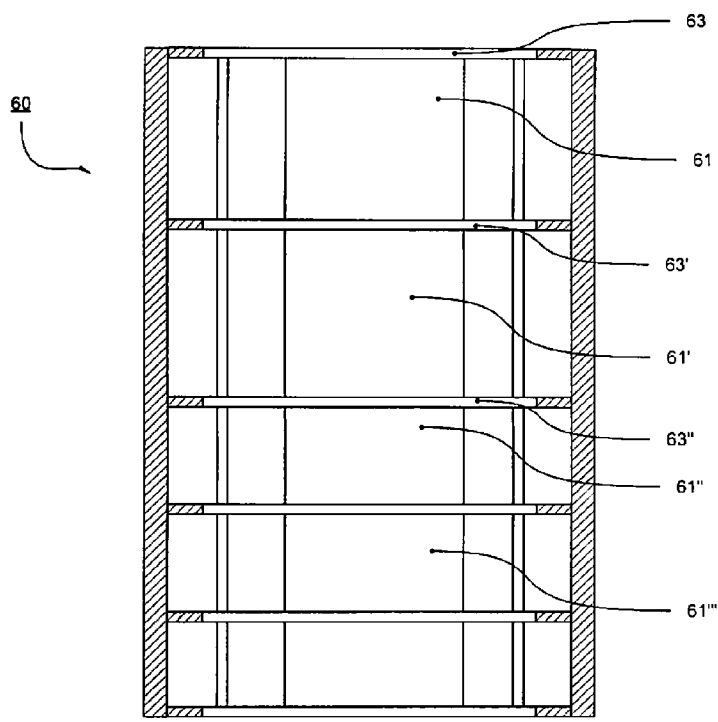
Figure 5:
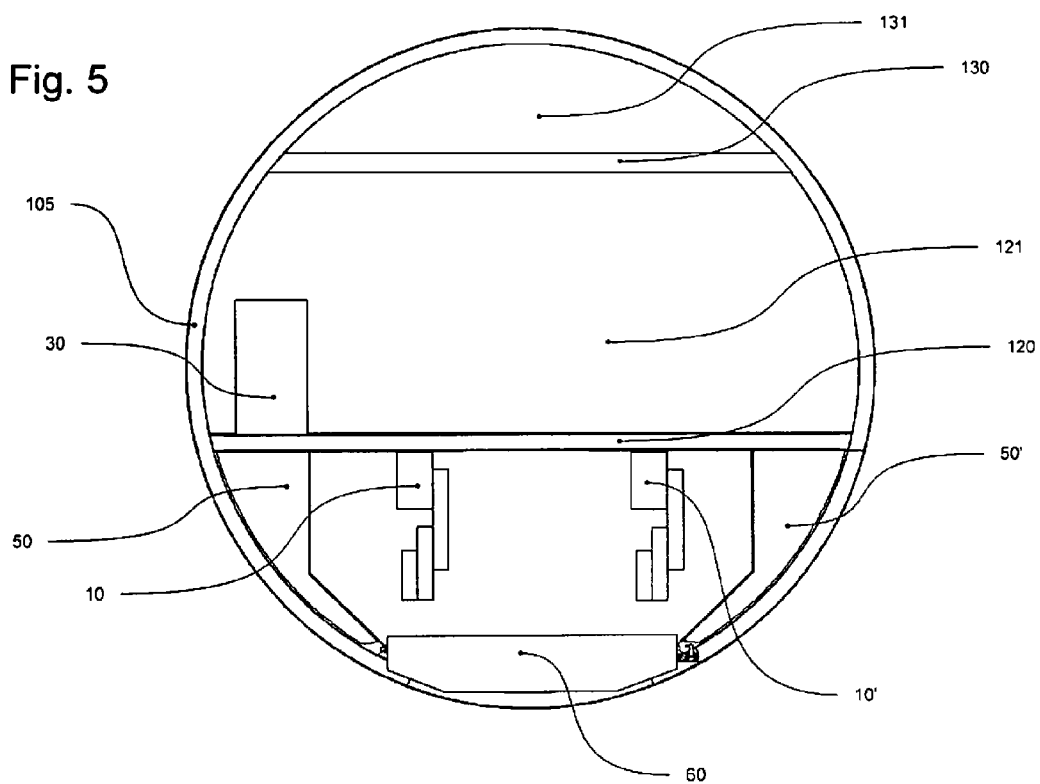
Figure 6:
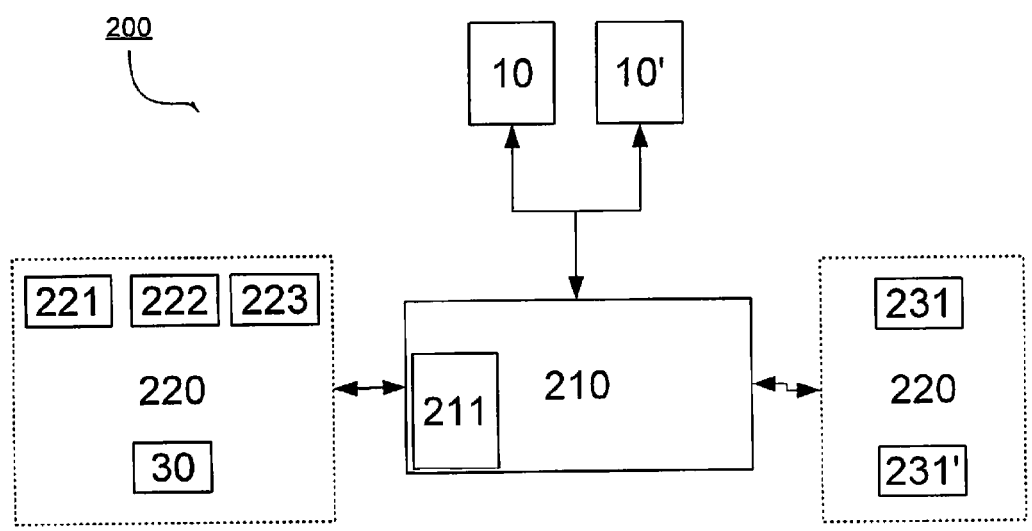
Figure 7:
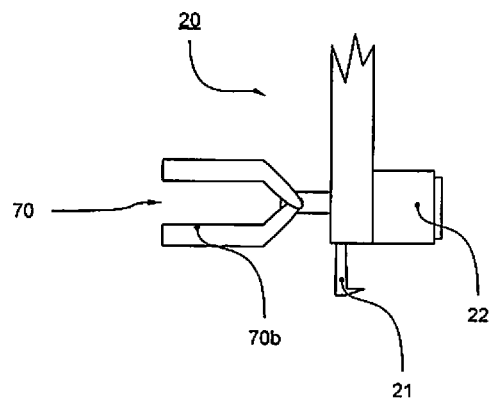
Figure 8:
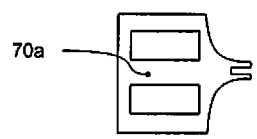
Figure 9:
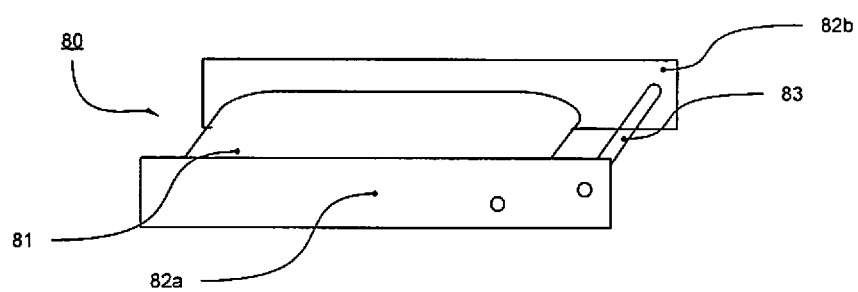

These show:

FIG. 1 a diagrammatic external view of an aircraft;

FIG. 2 a cross section through the fuselage of the aircraft from FIG. 1 with lower deck cargo compartment, passenger compartment and upper deck cargo compartment;

FIG. 3 a first longitudinal section through the aircraft fuselage from FIG. 2;

FIG. 4 a second longitudinal section through the aircraft fuselage from FIG. 2;

FIG. 5 a similar cross section to that in FIG. 2, wherein the lower deck cargo compartment is equipped with two robots;

FIG. 6 individual components of a freight administration device;

FIG. 7 an end segment of a robot with a gripper tool;

FIG. 8 a top view of part of the gripper tool from FIG. 7;

FIG. 9 a perspective side view of a deposit tool; and

Figure 10:
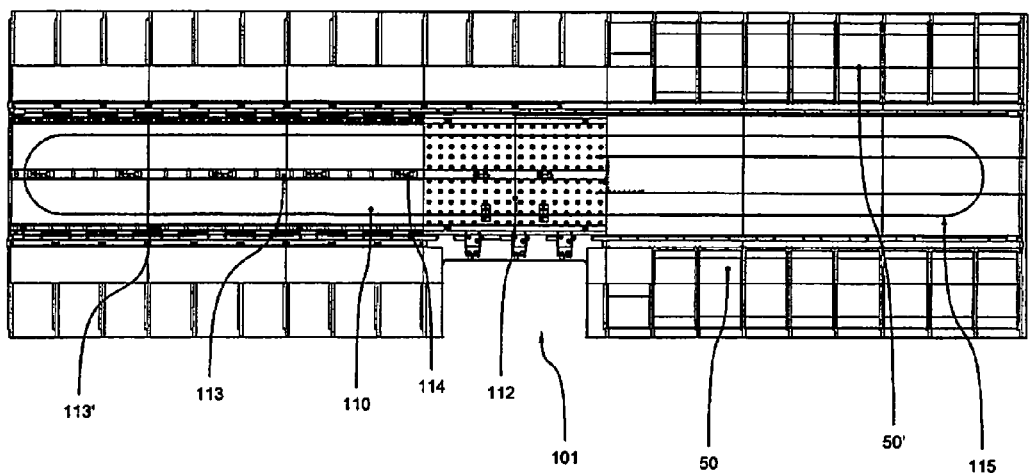

FIG. 10 a top view onto a lower deck.

DESCRIPTION

In the description below the same reference numerals are used for the same parts and those with similar effect.

FIG. 1 shows a side view of an aircraft 100. The aircraft 100 extends substantially along a longitudinal axis, namely the aircraft longitudinal direction X, wherein at the front part is the nose 103 and at the rear part the tail 102. Transverse to the vehicle longitudinal direction X and upwards extends the Z axis of the aircraft 100. On the side of the aircraft 100 is a loading hatch 101 via which freight items can be loaded into and unloaded from the aircraft 100.

FIG. 2 shows a cross section through the aircraft 100 from FIG. 1. The aircraft fuselage 105 of the aircraft 100 is substantially circular and divided by an upper deck 130 and a center deck 120 into substantially three segments, namely the upper deck cargo compartment 131 (crown region), a passenger compartment 121 and a lower deck cargo compartment 111. The lower cargo compartment 111 and the upper deck cargo compartment 131 serve to receive freight items, wherein the passenger compartment 121 is designed to accommodate passengers. In the embodiment example shown in FIG. 2, the lower deck cargo compartment 111 is equipped with a robot 10 and a first freight shelf unit 50, a second freight shelf unit 50' and a floor freight receiver 60. The upper deck cargo compartment 131 has no corresponding equipment. However it would easily be possible to equip the upper deck cargo compartment 131 accordingly. It would also be conceivable to provide only the upper deck cargo compartment 131 with a robot 10, 10', freight shelf units 50, 50' and/or the floor freight receiver 60. The freight shelf units 50, 50' and the floor freight receiver 60 are freight storage devices which serve to receive the freight items.

According to a first inventive concept, the robot 10 with a suitable robot arm 20 is used to load freight items onto the freight storage devices, in particular the freight shelf units 50, 50' and floor freight receiver 60. The robot 10 can furthermore be used to remove freight items from the freight storage devices and thus unload the aircraft 100. For example the freight items can be placed at the loading hatch 101 on a conveyor belt provided there.

According to a further inventive aspect, the robot 10 is used to load freight items handed over by a passenger in the passenger compartment 121, in the lower deck cargo compartment 111. For this a lift 30 is provided which receives the freight item in the passenger compartment 121 and transports it by means of a lift cabin 31 (see FIG. 3) to the lower deck cargo compartment 111. The robot 10 can remove the freight item from the lift cabin 31 and for example place it on the freight shelf unit 50.

According to a further inventive concept, the robot 10 is also used to transfer freight items from the lower deck cargo compartment 111 into the passenger compartment 121. This can be done while the aircraft 100 is at the airport or during flight. As soon as a particular freight item is requested, the robot 10 takes this freight item from one of the freight storage devices and places it in the lift cabin 31 so that the lift 30 can bring the freight item into the passenger compartment 121.

FIG. 3 shows amongst others a front view of the lift 30. This has an upper lift opening 33 and a lower lift opening 34. The upper lift opening 33 opens into the passenger compartment 121. The lower lift opening 34 opens into the lower deck cargo compartment 111 and is integrated in the first freight shelf unit 50. At the side of the lift 30 is arranged an input device 221 and an output device 222. In one embodiment example a passenger introduces a freight item into the lift cabin 31 which transports this to the lower deck cargo compartment 111. The robot 10 then loads the freight item in a freight storage device. Then the output device 222 displays a code e.g. a digit code. The passenger can note or remember this digit code. To retrieve his freight item he must enter the digit code in the input device 221, whereby the freight item is identified and can be provided by the robot 10.

In a further embodiment example the freight item has an RFID tag so that an RFID read device 223 (see FIG. 6) can detect an identification number stored on this tag. It is possible that the passenger has a further RFID tag which can be allocated to the RFID tag of the freight item. To this extent display of the identification number on the output device 222 is unnecessary. To retrieve his freight item, the passenger simply presents his RFID tag or stands in a position in which the RFID read device 222 can detect this RFID tag. Then the associated freight item is determined automatically and retrieved from the lower freight deck compartment 111 by the robot 10.

To guarantee rapid access to the freight items for the passengers, several robots 10, 10' (see FIG. 5) and/or several lifts 30 can be provided.

A further concept according to the invention is shown in the freight storage devices. The first freight shelf unit 50 for example has a multiplicity of freight compartments 51 to 51'''. The individual freight compartments 51 to 51' are each surrounded by four side walls which are partly formed by longitudinal partition panels 52, 52' and transverse partition panels 53, 53'. For example the freight compartment 51' is surrounded by the first longitudinal partition panel 52, the second longitudinal partition panel 52', the second transverse partition panel 53 and the third transverse partition panel 53''. The first transverse partition panel 53 forms a termination of the first freight shelf unit 50.

In one embodiment example the transverse partition panels 63', 63'' are arranged displaceable on a rail such that the freight compartments 51'', 51''' can be reduced in size as required. This allows the first shelf unit 50 to be loaded optimally with freight items. Alternatively the transverse partition panels 52, 52' can be arranged displaceable.

If it is assumed that only the transverse partition panels 53', 53'' are arranged mobile, the robot 10 on loading freight items could attempt to arrange freight items of the same width in a gap of the first freight shelf unit 50 and then move the transverse partition panels 53', 53'' such that the freight compartments 51 to 51''', in particular freight compartments 51', 51'', have an optimum width for the corresponding freight items.

Also the floor freight receiver as shown in FIG. 4 in top view (view direction onto lower deck 110) can be fitted with displaceable transverse partition panels 53 to 53'' to change the dimensions of a multiplicity of freight compartments 61 to 61'''.

The provision of the floor freight receiver 60 as shown in FIGS. 2 and 5 can also be regarded as an independent invention. Thus this floor freight receiver 60 allows substantially better use of the lower deck cargo compartment 111. This can be guaranteed in that regions of the cargo compartment which could not normally be used are now available as storage space. For example the floor freight receiver 60 can replace a walkable or driveable lower deck 110 as shown for example in FIG. 10. It is evident that the floor freight receiver 60 in its design can be adapted substantially better to the concave form of the aircraft fuselage 105 than can be achieved with a conventional freight deck. To this extent there are no unused cavities remaining.

Furthermore it is shown that the floor freight receiver 60 which has freight openings at the top can be loaded particularly advantageously by a robot 10, 10' which is suspended from a ceiling construction.

As already stated, the robot 10 or robots 10, 10' can also be used to stow freight items which have been presented via the loading hatch 101. Such a loading process is particularly advantageous for aircraft with cargo compartments of low construction height (e.g. narrow-bodied aircraft or regional jets). To ensure rapid loading and also unloading, as shown in FIG. 5 several robots can be provided. These are preferably suspended on a linear guide which allows the robot 10 to move to and fro from the nose 103 to the tail 102. It is conceivable that the robots 10, 10' each have their own linear guide and move to and fro next to each other in the lower deck cargo compartment 111. Preferably these linear guides are however connected together so that the robots 10, 10' can circulate on the ceiling of the lower deck cargo compartment 111. In a top view onto the lower deck cargo compartment 111 for example circulation can take place clockwise or counter-clockwise.

The equipment of the robot arm 20 is decisive for suitable transport of the freight items. FIG. 7 shows an example equipment of an end segment of this robot arm 20. This end segment has at least one, preferably at least two tools, namely a gripper tool 70 and a vacuum head 22 arranged opposite this. The vacuum head 22 can be used as a sucker on air-impermeable surfaces. For example the vacuum head 22 can be used as a sucker to lift a hard-shell case and hold this until it is stowed in one of the freight compartments 51 to 51''', 61 to 61'''.

The gripper tool 70 has a first gripper 71a and a second gripper 71b which are adapted to receive soft freight items, for example rucksacks. FIG. 8 shows a top view of the first gripper 71a. This is designed tabular so that it can receive larger freight items for example with a length of approx. 50 cm. The second gripper 71b can be formed correspondingly.

Instead of the gripper tool 70, a deposit tool 80 can be used as shown in FIG. 9. This has a conveyor belt 81 and two side limiters 82a, 82b which are arranged on either side of the conveyor belt 81. The conveyor belt can be driven by means of an actuator in a first and a second transport direction. To receive a freight item, the conveyor belt 81 is moved from the robot 10 to the freight item so that the conveyor belt 81 contacts the freight item. Transport then takes place in the first transport direction so that the freight item is transported to the deposit tool 80. The robot can then move the freight item to a suitable position and there operate the conveyor belt 81 such that this runs in the second transport direction and the freight item can be unloaded (ejected).

According to the invention, numerous other embodiments of the gripper tools are conceivable. For example a gripper tool could be used which is adapted to pick up handles of bags or cases.

The loading and unloading processes described can be implemented by a central or decentral computer system. Thus a freight administration device 200 according to the invention comprises at least one control unit 210 which is in communication connection with at least one robot 10. According to FIG. 6 there is a communication connection to both robots 10, 10'. The control unit 210 controls these robots 10, 10'. Corresponding control algorithms are stored on a memory device 211. Inter alia, the control unit 210 activates drive units to move the robots 10, 10' along the longitudinal direction of the aircraft and servo motors to move the robot arms 20. Also the servo motors for tools provided on the robot arms 20 can be activated by the control unit 210. Furthermore the control unit 210 can be in communication connection with the freight item receiver device 220. In one embodiment example this comprises the input device 221, the output device 222 and the RFID read device 223. Furthermore the freight item receiver device 220 contains the lift 30 which can also be controlled by the control unit 210. To this extent it is possible to coordinate the activities of the robots 10, 10' with those of the lift 30 and respond to input signals from the input device 221 or the read device 223.

In a further embodiment example, in the passenger compartment 121 are further RFID read devices 131, 131'. These are mounted such that they can determine the position of passengers carrying RFID tags. If a queue of passengers develops at the lift 30, the RFID read devices 131, 131' can determine the order of the individual passengers within the queue (e.g. by triangulation). Finally the RFID read devices 131, 131' installed in the passenger compartment 121 constitute a passenger detection device 230 which can also be in communication connection with the control unit 210. Where the control unit 210 can allocate a particular freight item to a particular passenger using this RFID tag, it is possible to prognosticate the individual requests which the lift 30 must fulfill. To this extent the freight administration device 200 can already take precautions for processing impending orders (e.g. collection of a particular freight item) in good time. In this context it is also possible to provide a buffer zone close to the lift region. This buffer zone can be used for temporary storage of freight items until these are required or until the lift cabin is available for these.

A further idea according to the invention is to use the robot 10 or robots 10, 10' not only for loading individual freight items. Rather the robots 10, 10' can also be used for loading freight containers.

FIG. 10 shows a top view of a freight deck according to the invention. In the right-hand region are provided freight shelf units 50, 50' to receive individual freight items. Finally here an individual freight item loading can take place. On the left of the loading hatch 101 is the lower deck 110 which is suitable for accommodating freight containers. For this in the floor region passive freight drive units are provided, namely the ball mats 112 and the roller tracks 113, 113'. Furthermore there are latch elements 114 which allow the freight containers to be fixed at particular positions. A peripheral guide 115 is also shown in FIG. 10. For loading a freight container for example this can be introduced into the loading hatch 101 via a conveyor belt. The robot 10 then moves up to this and pushes the freight container to the left on the roller tracks 113, 113'. As soon as the freight container has reached its target position, the robot 10 can be used to activate latch elements 114 such that the freight container is held in the prespecified position. For example the latch elements 114 can have latching claws which can be swiveled from a rest position into a holding position. This swivel process can be triggered by the robot 10. For this the robot arm 20 as shown in FIG. 7 can optionally be fitted with a latching claw 21, effectively a hook.

The robots 10, 10' described can also be adapted for tensioning nets as cargo compartment partitions. Secondly such nets can be used in connection with the freight shelf units 50, 50' or floor freight receiver 60 to prevent the freight items from falling out of the freight compartments 51 to 51''', 61 to 61'''.

The function of the freight administration device 200 described can be used in that image capture devices are provided. For example a corresponding image capture device can be provided on the robots 10, 10' to detect the rough shape of the freight item to be transported. Also an image capture can be useful when "parking" the freight items in the freight compartments 51 to 51''', 61 to 61'''.

As well as the sensors mentioned, heat, smoke and fire sensors can be provided to improve the functionality of the freight administration device 200 and prevent possible risk situations. Theoretically it would also be possible to use intelligent, in particular self-learning systems to improve the freight administration device 200.

LIST OF REFERENCE NUMERALS 10, 10' Robot
20 Robot arm
21 Latching claw
22 Vacuum head 30 Lift
31 Lift cabin
33 Upper lift opening
34 Lower lift opening
50, 50' Freight shelf unit
51, 51', 51", 51'" Freight compartment
52, 52' Longitudinal partition panel
53, 53', 53" Transverse partition panel
60 Floor freight receiver
61, 61', 61", 61'" Freight compartment
63, 63', 63" Transverse partition panel
70 Gripper tool
71a, 71b Gripper
80 Deposit tool
81 Conveyor belt
82a, 82b Side limiter
83 Fixing element
100 Aircraft
101 Loading hatch
102 Tail
103 Nose
105 Aircraft fuselage
110 Lower deck
111 Lower deck cargo compartment
112 Ball mat
113, 113' Roller track
114 Latching element
120 Center deck
121 Passenger compartment
130 Upper deck
131 Upper deck cargo compartment (crown region)
200 Freight administration device
210 Control unit
211 Memory device
220 Freight item receiver device
221 Input device
222 Output device
223 RFID read device
230 Passenger detection device
231, 231' RFID read device

The invention claimed is:

1. An aircraft having a cargo compartment and a passenger compartment and at least one freight administration device,
   wherein the freight administration device comprises at least one freight item receiver device to receive a freight item, at least one input device to detect a code allocated to the freight item, and at least one freight item loading robot,
   wherein the freight item receiver comprises a lift for transporting the freight item between the passenger compartment and the cargo compartment, the lift including a first opening opening into the passenger compartment and a second opening opening into the cargo compartment;
   wherein the robot is arranged displaceably in a peripheral linear guide on a ceiling construction or wall construction of the cargo compartment and has at least one robot arm with at least one receiver tool to receive freight items,
   wherein the freight administration device is adapted to control the robot such that a freight item received in the first opening of the lift is stowed in the cargo compartment after the detection of the code,
   wherein the freight administration device memorizes the storage position of the freight item in conjunction with the detected code,
   wherein the freight administration device is adapted to control at least the robot such that the associated freight item is provided from the cargo compartment to the second opening of the lift for transport to the passenger compartment after input of a code by means of the input device wherein the administration device uses the stored storage position to determine the position of the freight item.

2. The aircraft of claim 1, wherein the input device comprises a read device for an identification code, arranged on or in the freight item.

3. The aircraft of claim 2, wherein the read device is adapted to read a passive transponder or a 2D code or a 3D code.

4. The aircraft of claim 1, wherein the cargo compartment comprises a multiplicity of freight compartments each formed by a multiplicity of side walls and having at least one freight opening for insertion and removal of freight items and wherein the administration device controls the robot such that the freight items are inserted and removed from the freight compartments.

5. The aircraft of claim 1, wherein the freight item received by the receiver device is hand luggage, where the freight item is picked up by the robot.

6. The aircraft of claim 1, comprising a passenger detection device to detect the position of at least one passenger and provide corresponding position data, wherein the freight administration device is adapted to take into account the position data on an unloading process.

7. The aircraft of claim 1, wherein at least two robots are in the peripheral linear guide and comprise drive units for moving the robots along the linear guide such that the robots can pick up freight items at a loading hatch in a sequential manner.

8. A cargo compartment of an aircraft comprising at least two robots, each with at least one robot arm with at least one receiver tool to receive freight items, wherein the robots are arranged displaceably in a peripheral linear guide on a ceiling construction of the cargo compartment and comprise drive units for moving the robots along the linear guide such that the robots can pick up freight items at a loading hatch in a sequential manner.

9. The cargo compartment of claim 8, wherein the receiver tool comprises at least one vacuum head to hold freight items with an at least partially air-impermeable outer skin.

10. The cargo compartment of claim 8, wherein the receiver tool comprises at least one gripper tool for gripping freight items.

11. An aircraft having a cargo compartment and a passenger compartment and at least one freight administration device,
   wherein the freight administration device comprises at least one freight item receiver device to receive a freight item, at least one input device to detect a code allocated to the freight item, and at least one freight item loading robot,
   wherein the robot is arranged displaceably in a peripheral linear guide on a ceiling construction or wall construction of the cargo compartment and has at least one robot arm with at least one receiver tool to receive freight items,
   wherein the freight administration device is adapted, after input of a code by means of the input device, to control at least the robot such that the associated freight item is provided from the cargo compartment to the passenger compartment in the freight item receiver device,
   the cargo compartment comprises a freight deck with passive freight transport devices, the passive freight transport devices comprising ball mats or rollers or roller tracks, wherein the robot is designed and/or arranged for moving freight units stored on the freight conveyor devices.

12. A method for loading and unloading of an aircraft having a cargo compartment which comprises a robot arranged displaceably in a peripheral linear guide, a passenger compartment and at least one lift which connects the passenger compartment and the cargo compartment, the method comprising:

allowing a passenger to take individual freight items into the passenger compartment;

introducing the freight item into a first opening of the lift, the first opening opening into the passenger compartment;

transporting the freight item in the lift from the passenger compartment to the cargo compartment by the lift;

picking up the freight item at a second opening of the lift with a receiver tool of the robot, the second opening opening into the cargo compartment;

placing the freight item in a storage location in the cargo compartment by the robot and memorizing the storage position of the freight item in conjunction with a code allocated to the freight item;

providing the code to an input device in the passenger compartment by the passenger wanting to collect the freight item;

determining the position of the freight item using the code;

picking up the freight item at the storage location associated with the code in the cargo compartment;

placing the freight item in the lift through the second opening of the lift;

transporting the freight item from the cargo compartment to the passenger compartment by the lift;

providing the freight item to the passenger.

* * * * *